United States Patent
Song et al.

(10) Patent No.: US 12,475,312 B2
(45) Date of Patent: Nov. 18, 2025

(54) FOREIGN LANGUAGE PHRASES LEARNING SYSTEM BASED ON BASIC SENTENCE PATTERN UNIT DECOMPOSITION

(71) Applicant: Dr SONG CO., LTD., Seoul (KR)

(72) Inventors: Hwan Goo Song, Seoul (KR); Hyun Ji Yoon, Seoul (KR); Su Hyun Yoon, Seoul (KR); Hyun Suk Dan, Gimpo-si (KR); Ki Ho Kim, Daejeon (KR)

(73) Assignee: Dr SONG CO., LTD., Seoul (KR)

(*) Notice: Subject to any disclaimer, the term of this patent is extended or adjusted under 35 U.S.C. 154(b) by 0 days.

(21) Appl. No.: 18/020,514

(22) PCT Filed: Nov. 25, 2021

(86) PCT No.: PCT/KR2021/017468
§ 371 (c)(1),
(2) Date: Feb. 9, 2023

(87) PCT Pub. No.: WO2023/013826
PCT Pub. Date: Feb. 9, 2023

(65) Prior Publication Data
US 2024/0169150 A1 May 23, 2024

(30) Foreign Application Priority Data
Aug. 2, 2021 (KR) .................. 10-2021-0101350

(51) Int. Cl.
*G06F 40/263* (2020.01)
*G06F 40/211* (2020.01)
*G06F 40/242* (2020.01)
*G06F 40/268* (2020.01)
*G06F 40/289* (2020.01)

(52) U.S. Cl.
CPC .......... *G06F 40/263* (2020.01); *G06F 40/211* (2020.01); *G06F 40/242* (2020.01); *G06F 40/268* (2020.01); *G06F 40/289* (2020.01)

(58) Field of Classification Search
None
See application file for complete search history.

(56) References Cited

U.S. PATENT DOCUMENTS

| | | | | |
|---|---|---|---|---|
| 5,418,716 A | * | 5/1995 | Suematsu | G06F 40/253 704/9 |
| 2002/0013694 A1 | * | 1/2002 | Murata | G06F 40/211 704/10 |

(Continued)

FOREIGN PATENT DOCUMENTS

| | | |
|---|---|---|
| KR | 10-2015-0042532 | 4/2015 |
| KR | 10-1589621 | 1/2016 |

(Continued)

OTHER PUBLICATIONS

Halpern, "A Brief Inroduction to Japanese Morphology." Kanji.org, Dec. 16, 2005, https://www.kanji.org/japanese/writing/wordform.htm. Accessed Feb. 13, 2025. Accessed via webarchive.org, https://web.archive.org/web/20210511093620/https://www.kanji.org/japanese/writing/wordform.htm. (Year: 2005).*

(Continued)

*Primary Examiner* — Hai Phan
*Assistant Examiner* — Jon Christopher Meis

(57) ABSTRACT

Disclosed is a foreign language phrases learning system based on basic sentence pattern unit decomposition, and implemented in a computing device including at least one processor and at least one memory for storing instructions executable by the processor, which includes: a sentence decomposition unit, when a natural language composed of a foreign language is input from a user, for decomposing a compound sentence corresponding to the input natural language into a plurality of basic sentences; a sentence pattern determination unit for checking one of morphemes or words contained in each of the decomposed basic sentences when the compound sentence is completely decomposed by the (Continued)

sentence decomposition unit, thereby determining a sentence pattern for each of the basic sentences; an additional information designation unit, when the sentence pattern for each of the basic sentences is completely determined by the sentence pattern determination unit, for designating some of the morphemes or the words contained in each of the basic sentences as additional information; and an additional information storage unit for matching the additional information with one of the morphemes or the words, which are not designated as the additional information, when the designation of the additional information is completed, thereby storing the additional information in a basic morpheme category included in a pre-stored basic morpheme dictionary table. In addition, various embodiments identified through the present document are possible.

8 Claims, 7 Drawing Sheets

(56) References Cited

U.S. PATENT DOCUMENTS

| | | | | |
|---|---|---|---|---|
| 2005/0154690 | A1* | 7/2005 | Nitta | G06F 16/30 |
| | | | | 707/E17.058 |
| 2007/0213973 | A1* | 9/2007 | Rehberg | G06F 40/295 |
| | | | | 704/9 |
| 2008/0300857 | A1* | 12/2008 | Barbaiani | G06F 40/45 |
| | | | | 704/4 |
| 2013/0030787 | A1* | 1/2013 | Cancedda | G06F 40/44 |
| | | | | 704/2 |
| 2019/0333500 | A1* | 10/2019 | Kim | G10L 15/22 |

FOREIGN PATENT DOCUMENTS

| | | |
|---|---|---|
| KR | 10-2017-0083946 | 7/2017 |
| KR | 10-1755437 | 7/2017 |
| KR | 10-2018-0086801 | 8/2018 |

OTHER PUBLICATIONS

Stevens, "Sentence Patterns." University of Houston-Victoria, Aug. 2008, https://www.uhv.edu/curriculum-student-achievement/student-success/student-resources/q-z/sentence-patterns/. Accessed Feb. 13, 2025. (Year: 2008).*

Office Action for Korea Patent Application No. 10-2021-0101350, mailed Nov. 30, 2021.

PCT International Search Report for International Application No. PCT/KR2021/017468, Date of Mailing: Mar. 23, 2022.

* cited by examiner

[FIG. 1]
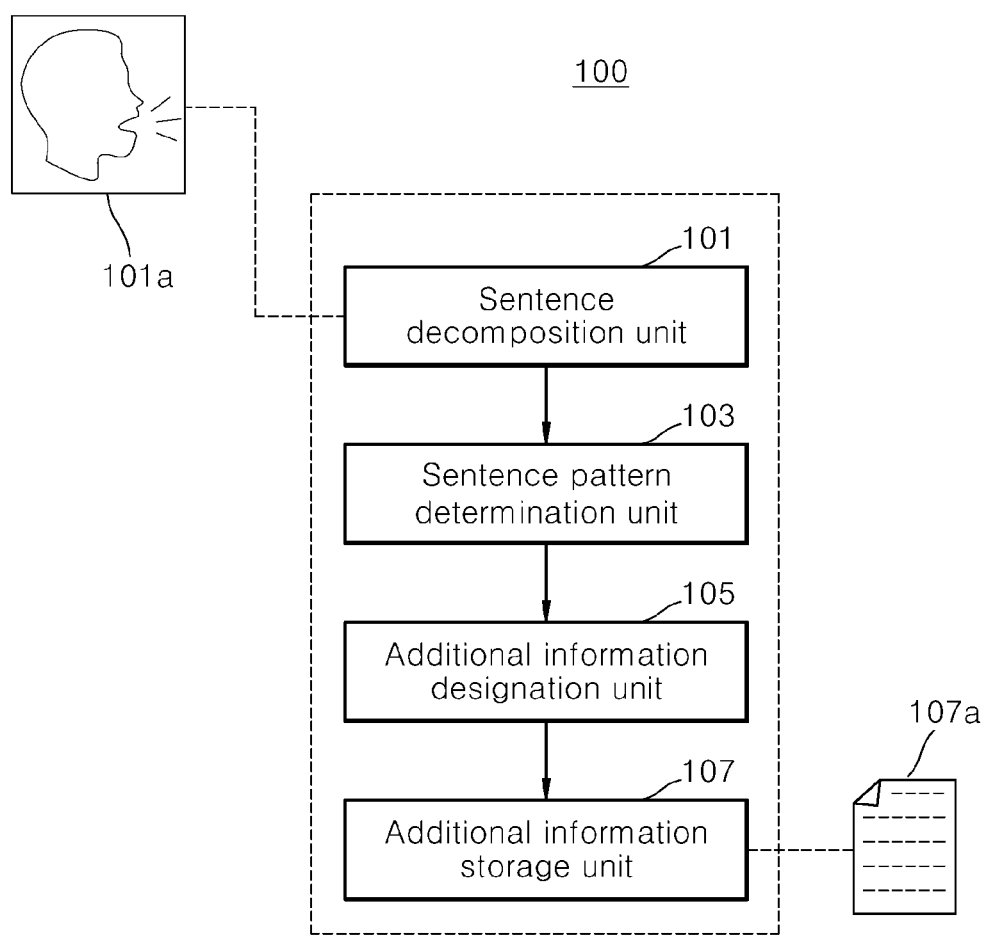

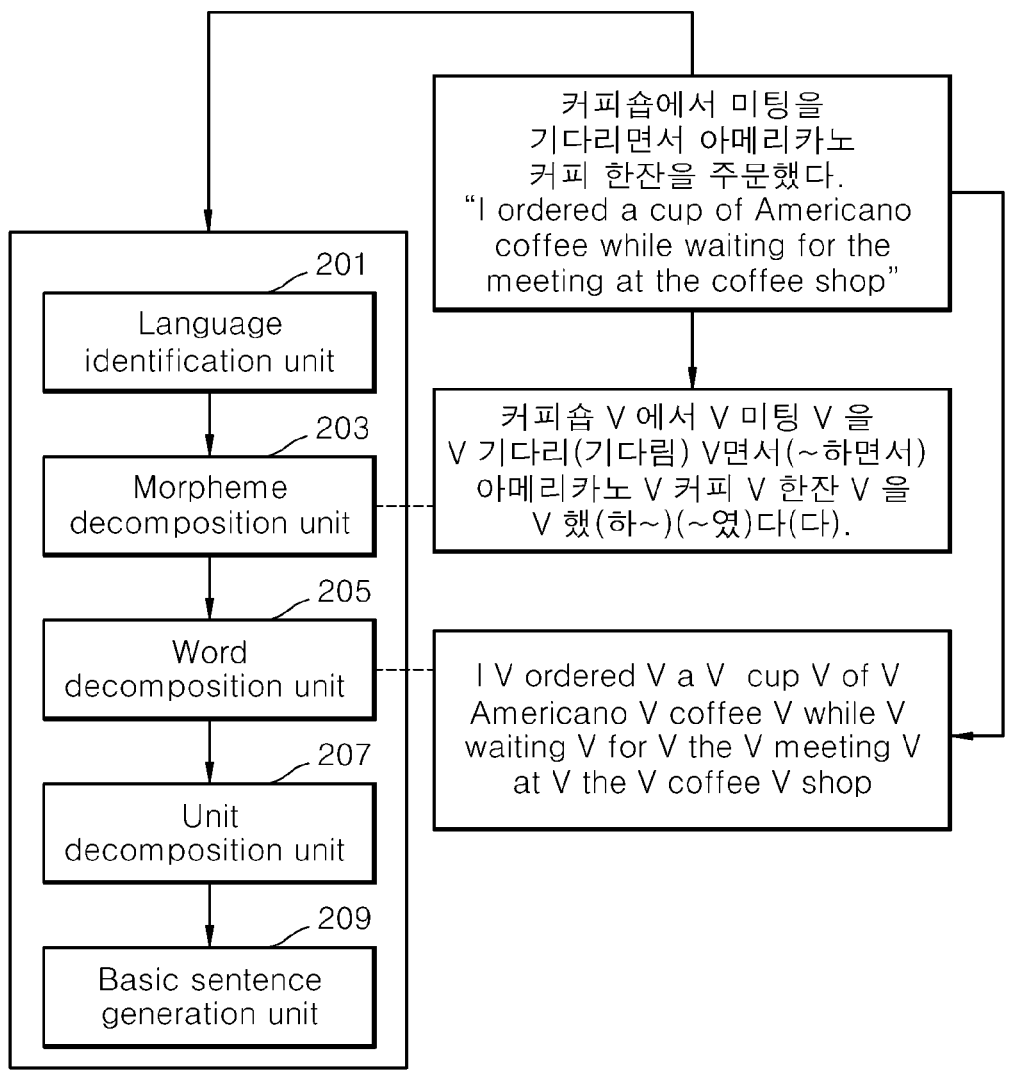

[FIG. 3]
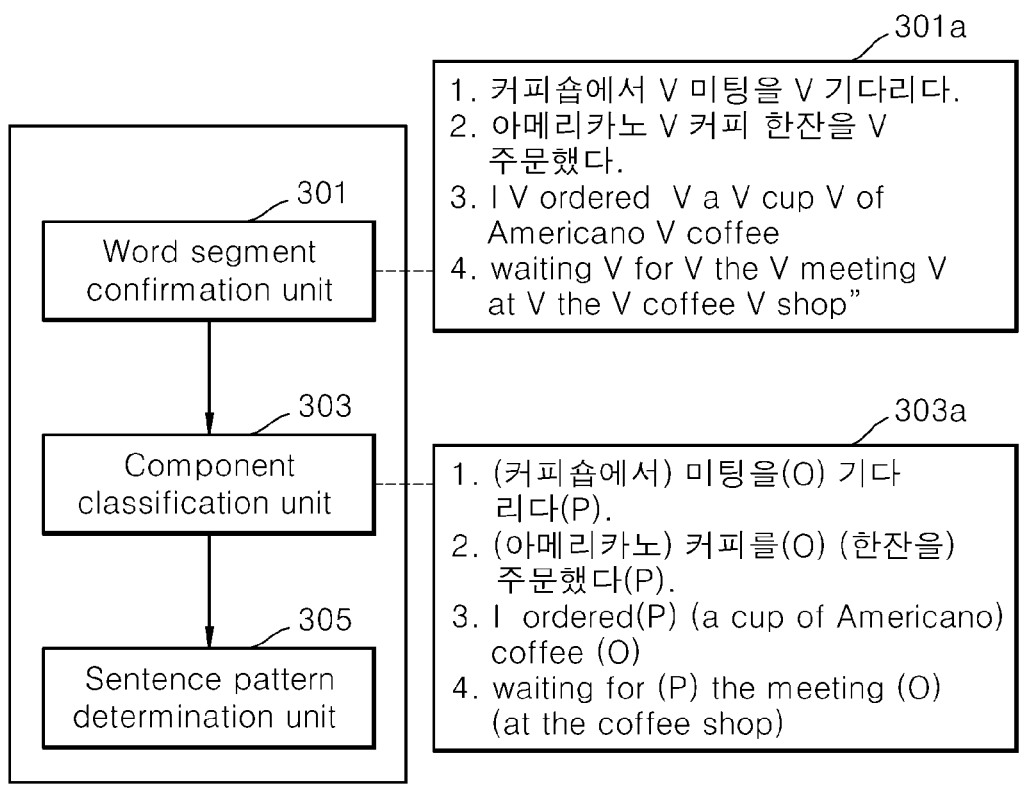

| Sentence pattern | Combination relation between word classes |
|---|---|
| Type 1 | Subject (S) + Predicate (P) |
| Type 2 | Subject (S) + Adverb (AD) + Predicate (P) |
| Type 3 | Subject (S) + Object (O) + Predicate (P) |
| Type 4 | Subject (S) + Complement (C) + Predicate (P) |
| Type 5 | Subject (S) + Object (O) + Complement (C) + Predicate (P) |

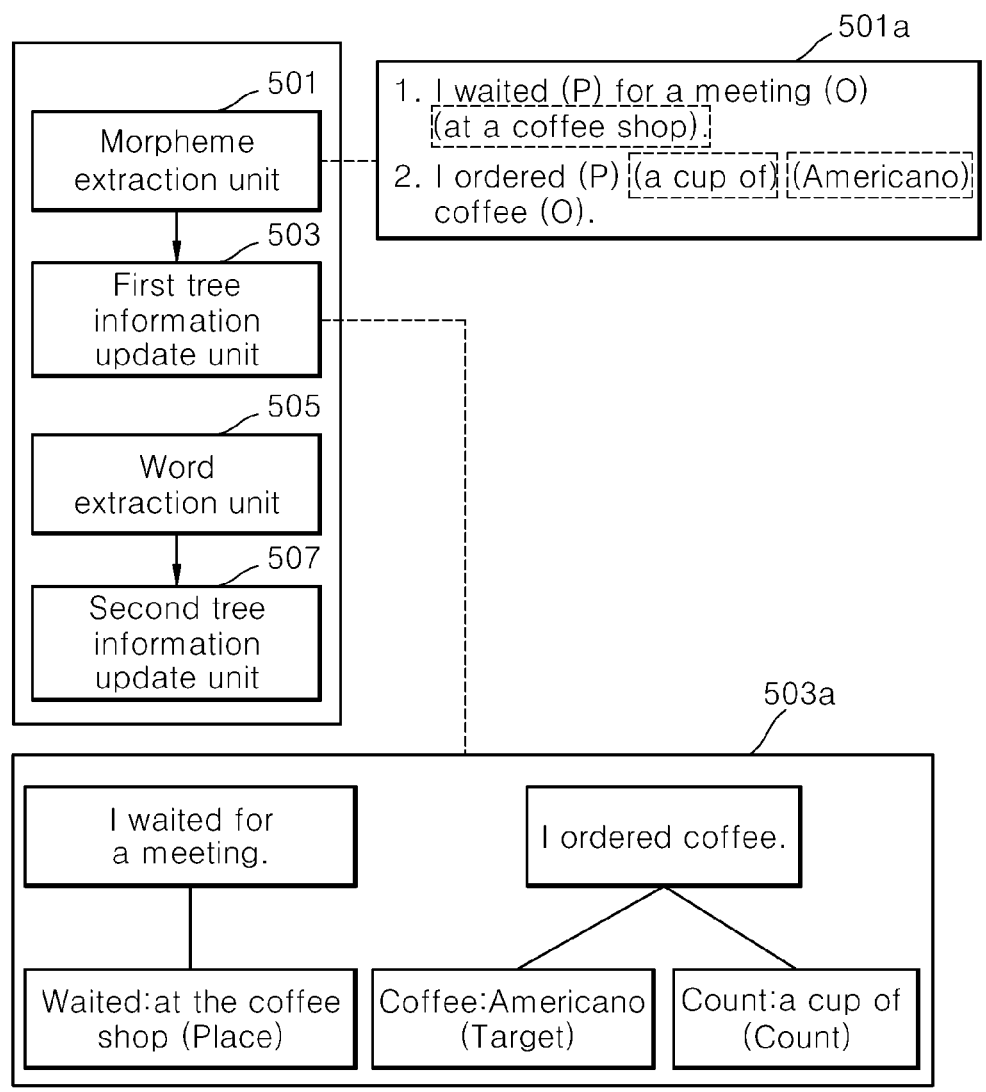

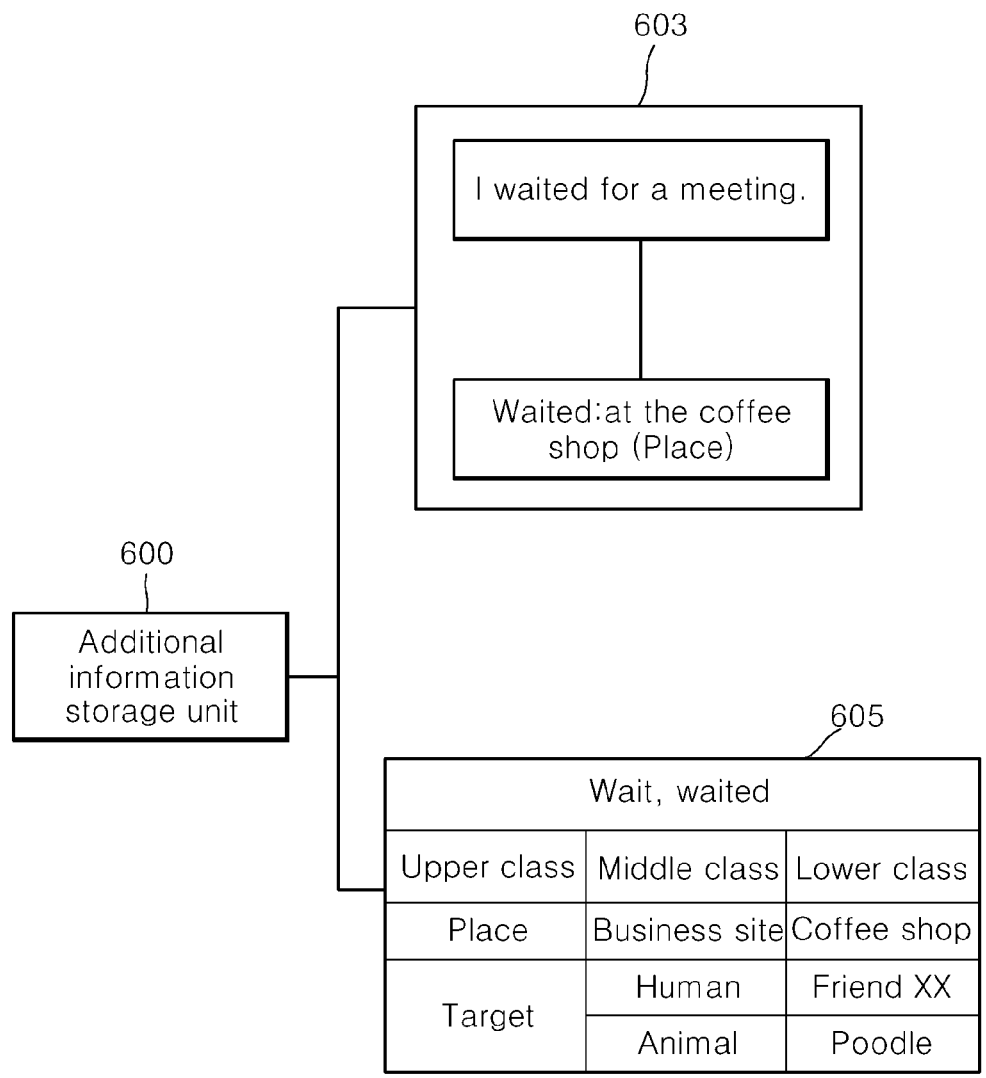

[FIG. 7]
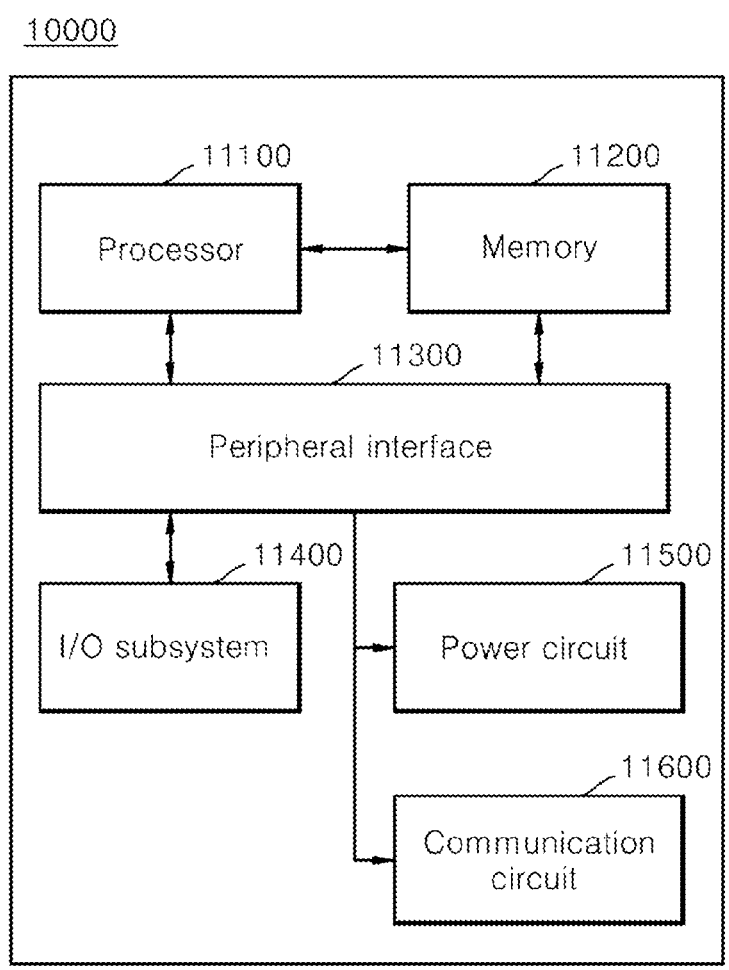

FOREIGN LANGUAGE PHRASES LEARNING SYSTEM BASED ON BASIC SENTENCE PATTERN UNIT DECOMPOSITION

TECHNICAL FIELD

The present invention relates to a foreign language phrases learning system based on basic sentence pattern unit decomposition, and more particularly, to a technology configured to, when a natural language composed of a foreign language is input from a user, identify whether a compound sentence corresponding to the input natural language is a morpheme-based sentence or a word-based sentence, decompose the identified compound sentence into a plurality of basic sentences, determine a sentence pattern of the basic sentence based on word segments of the basic sentence, extract additional information from the basic sentence based on the determined sentence pattern, and update tree information on the basic morpheme or basic word of the basic sentence based on the extracted additional information, thereby learning the foreign language phrases.

BACKGROUND ART

As artificial intelligence technology advances, the "language understanding technology" is a representative field in which the artificial intelligence is actively utilized and commercialized. The "language understanding technology" is represented by natural language processing (NLP), which includes a technology for understanding meanings from vast texts expressed by people, extracting and classifying information contained in the texts, and further directly generating texts.

However, when a syntax of a sentence composed of a foreign language is analyzed using artificial intelligence technology, there are difficulties in learning by recognizing the minimum unit of a sentence composed of various grammars and foreign languages for each country. Accordingly, companies developing technologies for processing natural languages through artificial intelligence have been developing various technologies for analyzing and learning syntaxes of foreign language sentences.

As an example, Korea Patent Publication No. 10-2014-0019094 (METHOD OF RE-PREPARING LEXICO-SEMANTIC-PATTERN FOR KOREAN SYNTAX RECOGNIZER) discloses the technology for generating sentences composed of morphemes, syllables and word segments, and understanding the meaning of the sentence through defined lexical semantic patterns.

However, the above-mentioned document in the related art discloses only the technique for understanding the meaning of the sentence through the lexical semantic patterns, but does not disclose the technology configured to, when a natural language composed of a foreign language is input by a user, identify whether a compound sentence corresponding to the input natural language is a morpheme-based sentence or a word-based sentence, decompose the identified compound sentence into a plurality of basic sentences, determine a sentence pattern of the basic sentence based on word segments of the basic sentence, extract additional information from the basic sentence based on the determined sentence pattern, and update tree information on the basic morpheme or basic word of the basic sentence based on the extracted additional information, thereby learning the foreign language phrases. Thus, the need for a technology for solve the above problem is emerging.

DISCLOSURE

Technical Problem

Accordingly, an object of the present invention is to provide a foreign language phrases learning system based on basic sentence pattern unit decomposition, which is configured to, when a natural language composed of a foreign language is input, identify whether a compound sentence corresponding to the input natural language is a morpheme-based sentence or a word-based sentence, decompose the identified compound sentence into a plurality of basic sentences, determine a sentence pattern of the basic sentence based on word segments of the basic sentence, extract additional information from the basic sentence based on the determined sentence pattern, and update tree information on the basic morpheme or basic word of the basic sentence based on the extracted additional information, thereby collecting additional information to understand the meaning suitable for the context of previous conversations even when the subject or object is omitted or a homonym is contained in the sentence composed of foreign languages.

Technical Solution

The foreign language phrases learning system based on basic sentence pattern unit decomposition and implemented in a computing device including at least one processor and at least one memory for storing instructions executable by the processor according to one embodiment of the present invention includes: a sentence decomposition unit, when a natural language composed of a foreign language is input from a user, for decomposing a compound sentence corresponding to the input natural language into a plurality of basic sentences; a sentence pattern determination unit for checking one of morphemes or words contained in each of the decomposed basic sentences when the compound sentence is completely decomposed by the sentence decomposition thereby determining a sentence pattern for each of the basic sentences; an additional information designation unit, when the sentence pattern for each of the basic sentences is completely determined by the sentence pattern determination unit, for designating some of the morphemes or the words contained in each of the basic sentences as additional information; and an additional information storage unit that matches the additional information with one of the morphemes or the words, which are not designated as the additional information when the designation of the additional information is completed, so as to store the additional information in a basic morpheme category included in a pre-stored basic morpheme dictionary table.

The sentence decomposition unit may include: a language identification unit for identifying a country for each foreign language corresponding to the natural language when the natural language is input, thereby determining whether the language of the identified country is a morpheme-based first language or a word-based second language; a morpheme decomposition unit for identifying a plurality of morphemes contained in a compound sentence corresponding to the input natural language when the natural language input by the language identification unit is determined as the first language, thereby decomposing the compound sentence according to morpheme; a word decomposition unit for identifying a plurality of words contained in a compound sentence corresponding to the input natural language when the natural language input by the language identification unit is determined as the second language, thereby decomposing the compound sentence according to words; a unit decomposition unit for analyzing the decomposed morphemes or words when the compound sentence is decomposed according to the morphemes or the words by performing the function of the morpheme decomposition unit or the word decomposition unit, thereby decomposing the compound sentence into predicate units based on the analysis results; and a basic sentence generation unit, when the compound sentence is decomposed into the predicate units by the unit decomposition unit, that generates the compound sentence, which is decomposed into the predicate units, as a plurality of basic sentences.

The sentence pattern determination unit may include: a word segment confirmation unit, when a plurality of basic sentences based on the first language or a plurality of basic sentences based on the second language are generated by the basic sentence generation unit, that confirms a plurality of word segments constituting each of the generated basic sentences based on the first language or the basic sentences based on the second language; a component classification unit, when the word segments for the basic sentences based on the first language or the basic sentences based on the second language are completely confirmed by the word segment confirmation unit, that identifies word classes of the morphemes or words contained in the word segments based on pre-stored word class classification information, thereby classifying sentence components of the word segments through the identified word classes, respectively; and a sentence pattern determining unit, when the sentence components of the word segments are completely classified by the component that identifies combinatorial classification unit, relationships between the classified sentence components, thereby determining a sentence pattern for the basic sentences based on the first language or the basic sentences based on the second language.

The sentence pattern may serve as a sentential form for each of the basic sentences determined based on combinational relationships between sentence components of the word segments or combinatorial relationships between sentence components of the words, and include: a first pattern configured by a combination of a subject and a predicate; a second pattern configured by a combination of the subject, an adverb and the predicate; a third pattern configured by a combination of the subject, an object and the predicate; a fourth pattern configured by a combination of the subject, a complement and the predicate; and a fifth type configured by a combination of the subject, the object, the complement and the predicate.

The additional information designation unit may include: a morpheme extraction unit that extracts second morphemes as remaining morphemes other than first morphemes corresponding to at least one of the basic morphemes contained in the pre-stored basic morpheme dictionary table among the morphemes contained in each of the first language-based basic sentences from which the sentence patterns are determined; a first tree information update unit for designating the second morphemes as additional information for the first morphemes when the second morphemes are completely extracted, thereby updating tree information of the first morphemes; a word extraction unit for extracting second words as remaining words other than first words corresponding to at least one of the basic words contained in the pre-stored basic word dictionary table among the words contained in each of the second language-based basic sentences from which the sentence patterns are determined; and a second tree information update unit for designating the second words as additional information for the first words when the second words are completely extracted, thereby updating tree information of the first words.

The tree information may serve as information of a tree structure subordinated to each basic morpheme or each basic word for each sentence pattern, and the second morpheme designated as the additional information may be updated to lower hierarchical information of the basic morpheme, or the second word designated as the additional information may be updated to lower hierarchical information of the basic word.

The additional information storage unit, when tree information of the first morpheme is updated by the tree information update unit, may update one additional information in the basic morpheme categories included in the pre-stored basic morpheme dictionary table based on the updated content, thereby synchronizing the pre-stored basic morpheme dictionary table based on tree information of the first morpheme, or when tree information of the first word is updated by the tree information update unit, may update one additional information in the basic word categories included in the pre-stored basic word dictionary table based on the updated content, thereby synchronizing the pre-stored basic word dictionary table based on tree information of the first word.

The pre-stored basic morpheme dictionary table may include data including a plurality of basic morpheme categories based on the basic morphemes serving as criteria for extracting the second morphemes for each sentence pattern, and may be formed in a graph structure for each of the basic morpheme categories in order to provide functions of searching and extracting additional information included in each of the basic morpheme categories, and the pre-stored basic word dictionary table may include data including a plurality of basic word categories based on the basic words serving as criteria for extracting the second words for each sentence pattern, and may be formed in a graph structure for each of the basic word categories in order to provide functions of searching and extracting additional information included in each of the basic word categories.

Advantageous Effects

The foreign language phrases learning system based on basic sentence pattern unit decomposition of the present invention, when a natural language composed of a foreign language is input from a user, may identify whether a compound sentence corresponding to the input natural language is a morpheme-based sentence or a word-based sentence, decompose the identified compound sentence into a plurality of basic sentences, determine a sentence pattern of the basic sentence based on word segments of the basic sentence, extract additional information from the basic sentence based on determined sentence pattern, and update tree information on the basic morpheme or basic word of the basic sentence based on the extracted additional information, so that foreign language phrases having various grammatical systems can be learned.

In addition, the compound sentence may be decomposed into a plurality of basic sentences, so that the meaning of each of the basic sentences can be accurately understood through a pre-stored morpheme dictionary table or a pre-stored word dictionary table.

In addition, additional information may be stored in a morpheme category included in the pre-stored morpheme dictionary table, or stored in a word category included in the pre-stored word dictionary table, so that additional information to be used as learning data can be gradually secured.

DESCRIPTION OF DRAWINGS

FIG. 1 is a block diagram for explaining a foreign language phrases learning system based on basic sentence pattern unit decomposition according to one embodiment of the present invention.

FIG. 2 is a block diagram for explaining a sentence decomposition unit of the foreign language phrases learning system based on basic sentence pattern unit decomposition according to one embodiment of the present invention.

FIG. 3 is a block diagram for explaining a sentence pattern determination unit of the foreign language phrases learning system based on basic sentence pattern unit decomposition according to one embodiment of the present invention.

FIG. 4 is a block diagram for explaining a combinational relationship of sentence components of the foreign language phrases learning system based on basic sentence pattern unit decomposition according to one embodiment of the present invention.

FIG. 5 is a block diagram for explaining an additional information designation unit of the foreign language phrases learning system based on basic sentence pattern unit decomposition according to one embodiment of the present invention.

FIG. 6 is a block diagram for explaining an additional information storage unit of the foreign language phrases learning system based on basic sentence pattern unit decomposition according to one embodiment of the present invention.

FIG. 7 is a diagram for explaining an example of an internal configuration of a computing device according to one embodiment of the present invention.

BEST MODE

Mode for Invention

Hereinafter, various embodiments and/or aspects will be described with reference to the drawings. In the following description, a plurality of specific details are set forth to provide comprehensive understanding of one or more aspects for the purpose of explanation. However, it will also be appreciated by a person having ordinary skill in the art that such aspect(s) may be carried out without the specific details. The following description and accompanying drawings will be set forth in detail for specific illustrative aspects among one or more aspects. However, the aspects are merely illustrative and some of various ways among principles of the various aspects may be employed, and the descriptions set forth herein are intended to include all the various aspects and equivalents thereof.

The term "embodiment", "example", "aspect", "exemplification", or the like as used herein may not be construed in that an aspect or design set forth herein is preferable or advantageous than other aspects or designs.

In addition, the terms "include" and/or "comprise" specify the presence of the corresponding feature and/or component, but do not preclude the possibility of the presence or addition of one or more other features, components or combinations thereof.

In addition, the terms including an ordinal number such as first and second may be used to describe various components, however, the components are not limited by the terms. The terms are used only for the purpose of distinguishing one component from another component. For example, the first component may be referred to as the second component without departing from the scope of the present invention, and similarly, the second component may also be referred to as the first component. The term "and/or" includes any one of a plurality of related listed items or a combination thereof.

In addition, unless defined otherwise in embodiments of the present invention, all terms used herein including technical or scientific terms have the same meaning as commonly understood by those having ordinary skill in the art. Terms such as those defined in generally used dictionaries will be interpreted to have the meaning consistent with the meaning in the context of the related art, and will not be interpreted as an ideal or excessively formal meaning unless expressly defined in an embodiment of the present invention.

FIG. 1 is a block diagram for explaining a foreign language phrases learning system based on basic sentence pattern unit decomposition according to one embodiment of the present invention.

Referring to FIG. 1, a foreign language phrases learning system 100 based on basic sentence pattern unit decomposition (hereinafter referred to as a learning system) and implemented in a computing device including at least one processor and at least one memory for storing instructions executable by the processor may include a sentence decomposition unit 101, a sentence pattern determination unit 103, an additional information designation unit 105, and an additional information storage unit 107.

Prior to disclosing the technical features of the present invention, foreign language sentences may include meanings that collectively refer to languages of various countries. Accordingly, foreign language sentences may have ambiguity in sentence combinations for each country due to different grammatical systems and minimum units of sentences (for example, morphemes or words), and essential sentence components such as subject and object may be added or omitted depending on the context. Accordingly, the learning system 100 of the present invention, when a sentence composed of a foreign language is input from a user, may identify a country of the input sentence, distinguish whether a language of the identified country is a morpheme-based first language or a word-based second language, extract additional information based on a language type of the input sentence, and subordinate the extracted additional information to basic morphemes or basic words, so that separate tree information may be generated.

The present invention corresponds to a technology related to syntax analysis included in the natural language processing technology, and more particularly, the learning system 100 may be a system for learning foreign language sentences by identifying a pattern of a foreign language sentence based on tree information and determining the meaning of the sentence based on the identified pattern so as to provide an appropriate answer.

According to one embodiment, when a natural language 101a composed of a foreign language is input from a user, the sentence decomposition unit 101 may decompose a compound sentence corresponding to the input natural language 101a into a plurality of basic sentences. The natural language 101a input from the user is the configuration based on voice or text input by the user, and may be recognized by the sentence decomposition unit 101.

The sentence composed of the input natural language 101a may be a sentence composed of a compound sentence including complex meanings. Accordingly, the sentence decomposition unit 101 may decompose the compound sentence into basic sentences (e.g., minimum unit sentences). Accordingly, a plurality of basic sentences may be generated by decomposing the compound sentence.

When a natural language is input from the outside, the sentence decomposition unit 101 may identify a country of a sentence corresponding to the input natural language. The sentence decomposition unit 101 may identify a minimum unit of the sentence corresponding to the natural language by checking whether the language of the identified country is a morpheme-based first language or a word-based second language.

According to one embodiment, the morpheme may refer to a minimum unit for analyzing the sentence, that is, a smallest language unit having a meaning. The word may refer to a unit for analyzing a language of a country in which sentence cannot be recognized in units of morphemes. See FIG. 2 for describing in detail that the sentence decomposition unit 101 decomposes the compound sentence into the basic sentences.

According to one embodiment, when the decomposition of the compound sentence is completed by the sentence decomposition unit 101, the sentence pattern determination unit 103 may check morphemes or words contained in each of the decomposed basic sentences, so that a sentence pattern for each of the basic sentences may be determined.

According to one embodiment, the sentence pattern determination unit 103 may determine a form of the sentence contained in each of the basic sentences. The sentence pattern may refer to a form of a sentence, that is, an arranged type of sentence components upon forming a sentence. See FIGS. 3 and 4 for describing in detail that the sentence pattern determination unit 103 determines the sentence pattern of the sentence.

According to one embodiment, when the sentence pattern for each of the basic sentences is completely determined by the sentence pattern determination unit 103, the additional information designation unit 105 may designate some of the morphemes contained in each of the basic sentences as additional information. In addition, the additional information designation unit 105 may designate some of the words contained in each of the basic sentences as additional information.

According to one embodiment, the additional information designation unit 105 may determine a sentence pattern for each of the basic sentences, and designate word segments, morphemes and words composed of the remaining morphemes or words, as additional information except for morphemes or words serving as criteria necessary for determining the sentence pattern.

More particularly, the additional information designation unit 105 may recognize the morphemes necessary for determining the sentence pattern for each of the basic sentences as basic morphemes (e.g., the first morphemes), and recognize the morphemes in the sentence other than the basic morphemes as second morphemes related to the basic morphemes, thereby recognizing the second morphemes as the additional information. In addition, the additional information designation unit 105 may recognize the words necessary for determining the sentence pattern for each of the basic sentences as basic words (e.g., the first words), and recognize the words in the sentence other than the basic words as second words related to the basic words, thereby recognizing the second words as the additional information.

In other words, the additional information designation unit 105 may determine the second morphemes (or second words) as morphemes derivable associated with the first morphemes (or first words), and determine the second morphemes as components that is not necessarily essential for determining the sentence pattern of the basic sentence, so that the second morphemes (or second words) may be designated as additional information for the first morphemes (or first words).

According to one embodiment, when the designation of the additional information is completed, the additional information storage unit 107 may match the additional information with the morphemes, which are not designated as the additional information (e.g., the first morphemes), so that the additional information may be stored in a basic morpheme category included in a pre-stored basic morpheme dictionary table. The pre-stored basic morpheme dictionary table refers to a data table including a basic morpheme category in which additional information is stored for each basic morpheme, and may include a plurality of basic morpheme categories. The morpheme category may be a category in which additional information matching with the basic morpheme is stored. See FIGS. 5 and 6 for detailed description related to the additional information storage unit 107.

According to one embodiment, when the designation of the additional information is completed, the additional information storage unit 107 may match the additional information with the words, which are not designated as the additional information (e.g., the first words), so that the additional information may be stored in a basic word category included in a pre-stored basic word dictionary table. The pre-stored basic word dictionary table refers to a data table including a basic word category in which additional information is stored for each basic word, and may include a plurality of basic word categories. The word category may be a category in which additional information matching with the basic word is stored. See FIGS. 5 and 6 for detailed description related to the additional information storage unit 107.

FIG. 2 is a block diagram for explaining a sentence decomposition unit of the foreign language phrases learning system based on basic sentence pattern unit decomposition according to one embodiment of the present invention.

Referring to FIG. 2, the foreign language phrases learning system based on basic sentence pattern unit decomposition and implemented in a computing device including at least one processor and at least one memory for storing instructions executable by the processor (e.g., the foreign language phrases learning system 100 based on basic sentence pattern unit decomposition of FIG. 1 (hereinafter referred to as a learning system)) may include a sentence decomposition unit 200 (e.g., the sentence decomposition unit 101 of FIG. 1)

According to one embodiment, when a natural language 200a composed of a foreign language is input from a user, the sentence decomposition unit 200 may decompose a compound sentence corresponding to the input natural language 200a into a plurality of basic sentences. For example, the sentence decomposition unit 200 may receive "커피숍에서 미팅을 기다리면서 아메리카노 커피 한잔을 주문했다", which is a natural language composed of a foreign language from the user, or "I ordered a cup of Americano coffee while waiting for the meeting at the coffee shop".

According to one embodiment, the sentence decomposition unit 200 may include a language identification unit 201, a morpheme decomposition unit 203, a word decomposition unit 205, a unit decomposition unit 207, and a basic sentence generation unit 209.

According to one embodiment, when the natural language is input, the language identification unit 201 may identify a country for each foreign language corresponding to the natural language, thereby checking whether the language of the identified country is a morpheme-based first language or a word-based second language. For example, the morpheme-based first language may include Korean and Japanese. However, the present invention is not limited thereto. In addition, the word-based second language may include English. However, the present invention is not limited thereto.

According to one embodiment, when the input natural language is confirmed as the first language, the morpheme decomposition unit 203 may identify a plurality of morphemes contained in a compound sentence corresponding to the input natural language, thereby decomposing the compound sentence according to the morphemes. For example, the morpheme decomposition unit 203 may decompose the compound sentence "커피숍에서 미팅을 기다리면서 아메리카노 커피 한잔을 주문했다" according to morphemes.

The morpheme decomposition unit 203 may decompose the compound sentence 200*a* "커피숍에서 미팅을 기다리면서 아메리카노 커피 한잔을 주문했다" into a total of 15 morphemes "커피숍" v "에서" v "미팅" v "을" v "기다리 (기다림)" v "면서 (~하면서)" v "아메리카노" v "커피" v "한(하나)" v "~잔" v "~을" v "주문" v "했(하~) (~였)" v 다 (~다)".

According to one embodiment, when the natural language input by the language identification unit 201 is confirmed as the second language, the word decomposition unit 205 may identify a plurality of words contained in a compound sentence corresponding to the input natural language, thereby decomposing the compound sentence according to the words.

For example, the word decomposition unit 205 may decompose the compound sentence "I ordered a cup of Americano coffee while waiting for the meeting at the coffee shop" according to words.

The word decomposition unit 205 may decompose "I ordered a cup of Americano coffee while waiting for the meeting at the coffee shop" into a total of 16 words "I" v "ordered" v "a" v "cup" v "of" v "Americano" v "coffee" v "while" v "waiting" v "for" v "the" v "meeting" v "at" v "the" v "coffee" v "shop".

According to one embodiment, when the compound sentence is decomposed according to the morphemes or the words by performing the function of the morpheme decomposition unit 203 or the word decomposition unit 205, the unit decomposition unit 207 may analyze the decomposed morphemes or words, thereby decomposing the compound sentence into predicate units based on the analysis results.

According to one embodiment, the unit decomposition unit 207 may distinguish a morpheme type of each decomposed morpheme. The type of morpheme may be classified into a free morpheme (a morpheme that can be used alone (e.g., 커피숍, 미팅, 아메리카노, 커피, 주문)), a bound morpheme (a morpheme that is used dependently on other words (e.g., ~에서, ~을, "기다리~", ~면서", ~했다)), a full morpheme (a morpheme having a substantive meaning (e.g., same as the free morpheme)), and an empty morpheme (a morpheme that adds a grammatical relationship or formal meaning (e.g., postposition, ending, and affix)). The unit decomposition unit 207 may analyze a type of each of the decomposed morphemes. The unit decomposition unit 207 may separately identify a type of each of the decomposed morphemes based on the pre-stored morpheme information.

According to one embodiment, the unit decomposition unit 207 may decompose the compound sentence into predicate units based on the analysis results. The unit decomposition unit 207 may classify the types of the decomposed morphemes, and recognize a morpheme corresponding to the empty morpheme and having a characteristic of describing a sentence, thereby decomposing the compound sentence into predicate units. For example, the unit decomposition unit 207 may separate empty morphemes from the decomposed morphemes "커피숍" v "에서" v "미팅" v "을" v "기다리 (기다림)" v "면서 (~하면서)" v "아메리카노" v "커피" v "한(하다)" v "잔" v "을" v "주문" v "했(하~) (~였)" v 다 (~다)", and recognize "기다리면서" and "주문했다", which have a predicate characteristic, thereby decomposing the compound sentence "커피숍에서 미팅을 기다리면서 아메리카노 커피 한잔을 주문했다" into "커피숍에서 미팅을 기다리면서" and "아메리카노 커피 한잔을 주문했다", which are decomposed into predicate units.

According to one embodiment, the unit decomposition unit 207 may distinguish words included in conjunctions among the decomposed words. The unit decomposition unit 207 may identify a conjunction by classifying each type of the decomposed words based on the pre-stored word information. The unit decomposition unit 207 may decompose the compound sentence into predicate units based on the identified conjunction.

According to one embodiment, the unit decomposition unit 207 may decompose the compound sentence into predicate units based on the analysis results. The unit decomposition unit 207 may distinguish conjunctions in the sentence by classifying the types of the decomposed words. For example, the unit decomposition unit 207 may distinguish the words of the decomposed "I" v "ordered" v "a" v "cup" v "of" v "Americano" v "coffee" v "while" v "waiting" v "for" v "the" v "meeting" v "at" v "the" v "coffee" v "shop", and recognize the conjunction "while". Accordingly, the unit decomposition unit 205 may decompose the compound sentence "I ordered a cup of Americano coffee while waiting for the meeting at the coffee shop" which are decomposed into predicate units into "I ordered a cup of Americano coffee" and "waiting for the meeting at the coffee shop".

According to one embodiment, when the compound sentence is decomposed into the predicate units by the unit decomposition unit 205, the basic sentence generation unit 209 may generate the compound sentence, which is decomposed into the predicate units, as a plurality of basic sentences. The basic sentence may be a minimum unit sentence containing only one meaning, other than a sentence used in a compound meaning. For example, the basic sentence generation unit 209 may generate two basic sentences of "커피숍에서 미팅을 기다리다" and "아메리카노 커피 한잔을 주문했다" from "커피숍에서 미팅을 기다리면서" and "아메리카노 커피 한잔을 주문했다" which are decomposed into the predicate units by the unit decomposition unit 205.

In addition, the basic sentence generation unit 209 may generate two basic sentences of "I ordered a cup of Americano coffee" and "waiting for the meeting at the coffee shop" which are decomposed into the predicate units by the unit decomposition unit 207.

FIG. 3 is a block diagram for explaining a sentence pattern determination unit of the foreign language phrases learning system based on basic sentence pattern unit decomposition according to one embodiment of the present invention.

Referring to FIG. 3, the foreign language phrases learning system based on basic sentence pattern unit decomposition and implemented in a computing device including at least one processor and at least one memory for storing instructions executable by the processor (e.g., the foreign language phrases learning system 100 based on basic sentence pattern unit decomposition of FIG. 1 (hereinafter referred to as a learning system)) may include a sentence pattern determination unit 300 (e.g., the sentence decomposition unit 103 in FIG. 1).

According to one embodiment, when the decomposition of the compound sentence is completed by the sentence decomposition unit (e.g., the sentence decomposition unit 101 of FIG. 1), the sentence pattern determination unit 300 may identify the morphemes or words contained in each of the basic sentences generated as the compound sentence is decomposed. The sentence pattern determination unit 300 may distinguish whether to check morphemes or whether to check words in the basic sentences, based on whether the sentence corresponding to the natural language identified by the sentence decomposition unit (e.g., the sentence decomposition unit 101 of FIG. 1) is a sentence composed of the first language or a sentence composed of the second language.

According to one embodiment, the sentence pattern determination unit 300 may determine a sentence pattern for each of the basic sentences based on the check result.

According to one embodiment, the sentence pattern determination unit 300 may include a word segment confirmation unit 301, a component classification unit 303, and a sentence pattern determination unit 305.

According to one embodiment, when a plurality of basic sentences based on the first language or a plurality of basic sentences based on the second language are generated by the basic sentence generation unit (e.g., the basic sentence generation unit 209 of FIG. 2), the word confirmation unit 301 may confirm a plurality of word segments constituting each of the generated basic sentences based on the first language or the basic sentences based on the second language. The word segment refers to each segment constituting a sentence, is a smallest unit of sentence components, and may be a configuration serving as a unit of spacing.

According to one embodiment, the word confirmation unit 301 may perform a tokenization process to identify at least one word segment in a plurality of basic sentences based on the first language. When the tokenization process is processed, the word confirmation unit 301 may perform morpheme tokenization instead of word tokenization. The word confirmation unit 301 may recognize morphemes contained in each of the basic sentences, and distinguish types of morphemes. See FIG. 2 for describing in detail that the morphemes are distinguished.

According to one embodiment, the word confirmation unit 301 may distinguish types of the morphemes to recognize a combination of free morphemes and bound morphemes as one token, thereby designating the one token as a single word.

According to one embodiment, the tokenization process of the morpheme tokenization may be performed, so that a plurality of word segments contained in the basic sentence may be identified. For example, the word confirmation unit 301 may identify word segments in the two basic sentences "커피숍에서 미팅을 기다리다" and "아메리카노 커피 한잔을 주문했다". The word confirmation unit 301 may perform the morpheme tokenization for "커피숍에서 미팅을 기다리다", thereby identifying three words 301a of "커피숍에서" v "미팅을" v "기다리다". In addition, the word confirmation unit 301 may perform the morpheme tokenization for "아메리카노 커피 한잔을 주문했다", thereby identifying three words 301a of "아메리카노" v "커피 한잔을" v "주문했다".

According to one embodiment, when the basic sentences based on the second language are generated by the basic sentence generation unit, the word confirmation unit 301 may identify at least one word segment constituting each of the generated basic sentences based on the second language.

According to one embodiment, the word confirmation unit 301 may perform a tokenization process to identify at least one word segment in a plurality of basic sentences based on the second language. When the tokenization process is process, the word confirmation unit 301 may perform word tokenization instead of morpheme tokenization.

According to one embodiment, when the basic sentences are basic sentences based on the second language, the word confirmation unit 301 may perform a tokenization process to identify at least one word segment in the sentences. When the tokenization process is process, the word confirmation unit 301 may perform word tokenization instead of morpheme tokenization. Since a criterion for a token in a sentence is designated as a word, the word tokenization may basically refer to tokenization based on spacing.

According to one embodiment, the word tokenization may include first word tokenization. The first word tokenization may refer to a scheme of separating words based on spacing in a foreign language sentence, and segmenting commas (,) and periods (.) as separate tokens. In addition, when an apostrophe (') is present in the foreign language sentence, the first word tokenization may be a scheme of classifying the apostrophe as a separate token.

According to one embodiment, the word tokenization may include second word tokenization. The second word tokenization may be a scheme of changing all alphabets in a foreign language sentence to lowercase, and removing punctuation marks such as periods (.), commas (,) and exclamation marks (!). However, the second word tokenization may be a scheme of classifying the apostrophe (') as a token by preserving without removing the apostrophe.

According to one embodiment, the word confirmation unit 301 may perform the word tokenization process, so that a plurality of word segments contained in the basic sentence may be identified. For example, the word confirmation unit 301 may identify word segments in the two basic sentences "I ordered a cup of Americano coffee" and "waiting for the meeting at the coffee shop". The word confirmation unit 301 may perform the word tokenization for "I ordered a cup of Americano coffee", thereby identifying seven words 301a of "I" v "ordered" v "a" v "cup" v "of" v "Americano" v "coffee".

According to one embodiment, when a plurality of words for the basic sentences based on the first language or the basic sentences based on the second language are completely identified, the component classification unit 303 may identify word classes of the morphemes or words contained in the word segments based on pre-stored word class classification information, thereby classifying sentence components of the word segments through the identified word classes, respectively. The pre-stored word class classification information may refer to word class information.

According to one embodiment, the component classification unit 303 may define word classes of the morphemes or words through the pre-stored word class classification information. The pre-stored word class classification information may include criterion morpheme information for defining a word class of each morpheme (including word class information).

More particularly, the component classification unit 303 may define a word class of each of the morphemes or words through the pre-stored word class classification information, and determine a sentence component of a configuration recognized as one token among the morphemes or words in which word classes are defined. For example, the component classification unit 303 may classify word classes of "미팅" and "을" based on the pre-stored word class classification information. The component classification unit 303 may classify the "미팅" as a noun, and classify the "을" as a postposition. The component classification unit 303 may determine a sentence component of "미팅을", which is recognized as one token, as an object, based on the classified word classes.

On the contrary, the component classification unit 303 may classify word classes of "a" v "cup" v "of" v "Americano" v "coffee", based on the pre-stored word class classification information. The component classification unit 303 may classify the "a" as an article, the "cup", "Americano" and "coffee" as nouns, and the "of" as a preposition. The component classification unit 303 may determine a sentence component of "a cup of Americano coffee" as an object, based on the classified word classes.

According to one embodiment, when the sentence components of the word segments are completely classified by the component classification unit 303, the sentence pattern determination unit 305 may identify combinatorial relationships between the classified sentence components, thereby determining sentence patterns of the basic sentences based on the first language or the basic sentences based on the second language.

Referring to FIG. 4, FIG. 4 shows a table containing five sentence patterns.

According to one embodiment, the first pattern may be a sentence pattern by a combination of a subject and a predicate, the second pattern may be a sentence pattern by a combination of a subject, an adverb and a predicate, the third pattern may be a sentence pattern by a combination of a subject, an object and a predicate, the fourth pattern may be a sentence pattern by a combination of a subject, a complement and a predicate, and the fifth pattern may be a sentence pattern by a subject, an object, a complement and a predicate. In other words, the sentence patterns may be a sentential form for each of the basic sentences determined based on the combinatorial relationships between sentence components of a plurality of word segments.

According to one embodiment, the sentence pattern determination unit 305 may identify the combinational relationships between the sentence components of the word segments based on the contents disclosed in the above table, thereby determining sentence patterns of the basic sentences based on the first language or the basic sentences based on the second language.

FIG. 5 is a block diagram for explaining an additional information designation unit of the foreign language phrases learning system based on basic sentence pattern unit decomposition according to one embodiment of the present invention.

Referring to FIG. 5, the foreign language phrases learning system based on basic sentence pattern unit decomposition and implemented in a computing device including at least one processor and at least one memory for storing instructions executable by the processor (e.g., the foreign language phrases learning system 100 based on basic sentence pattern unit decomposition of FIG. 1 (hereinafter referred to as a learning system)) may include an additional information designation unit 500 (e.g., the additional information designation unit 105 in FIG. 1).

According to one embodiment, when the sentence pattern for each of the basic sentences is completely determined by the sentence pattern determination unit (e.g., the sentence pattern determination unit 305 of FIG. 3), the additional information designation unit 500 may designate some of the morphemes or words contained in each of the basic sentences, which are completed in determination of the sentence patterns, as additional information.

According to one embodiment, the additional information designation unit 500 may include a morpheme extraction unit 501, a first tree information update unit 503, a word extraction unit 505, and a second tree information update unit 507.

According to one embodiment, the morpheme extraction unit 501 may extract second morphemes as remaining morphemes other than first morphemes corresponding to at least one of the basic morphemes contained in the pre-stored basic morpheme dictionary table among the morphemes contained in each of the first language-based basic sentences from which the sentence patterns are determined. The basic morpheme refers to a morpheme stored in the pre-stored basic morpheme dictionary table, and may be reference information for extracting a second morpheme, which is a morpheme associated with the basic morpheme, based on the basic morpheme from a plurality of basic sentences, so as to match with the extracted second morpheme. The first morpheme refers to a morpheme contained in the basic sentences, and may be a configuration corresponding to the basic morpheme. In other words, the basic morpheme may be information serving as a reference for extracting additional information.

For example, the morpheme extraction unit 501 may extract second morphemes from a plurality of basic sentences 501*a* "커피숍에서 미팅을 기다리다" and "아메리카노 커피 한잔을 주문했다". In other words, the morpheme extraction unit 501 may recognize "미팅을", "기다리다", "커피를" and "주문했다", which correspond to the basic morphemes in the basic sentences 501*a*, as first morphemes, and may extract remaining morphemes other than the first morphemes, such as "커피숍에서", "아메리카노" and "한잔을", as second morphemes.

According to one embodiment, when the second morphemes are completely extracted from each of the basic sentences, the first tree information update unit 503 may designate the second morphemes as additional information for the first morphemes, thereby updating tree information 503*a* of the first morphemes. The tree information 503*a* refers to information of a tree structure subordinated to each basic morpheme for each sentence pattern, and may be information updated as the second morpheme designated when the additional information is updated to lower hierarchical information of the basic morpheme.

According to one embodiment, the learning system may generate and update separate tree information 503*a* for each basic morpheme for each sentence pattern, to subordinate the second morpheme, as new additional information to lower hierarchical information of the basic morpheme, so that data required for syntax analysis may be accumulated. In other words, the tree information 503*a* may be information generated or updated as a new morpheme associated with the basic morpheme is added, based on the sentence patterns and the basic morphemes.

For example, when the second morphemes are completely extracted from the basic sentences 501a, the first tree information update unit 503 may subordinate the extracted second morphemes to the basic morphemes, which correspond to the first morphemes, as lower hierarchical information. More particularly, the first tree information update unit 503 may subordinate the second morphemes "커피숍에서" to the basic morphemes "미팅을" and "기다리다" as lower hierarchical information, thereby updating the tree information 503a. In addition, the first tree information update unit 503 may subordinate the second morphemes "아메리카노" and "한잔을" to "커피를" and "주문했다" as lower hierarchical information, thereby updating the tree information 503a.

According to another embodiment, when the second morphemes are completely extracted from the basic sentences 501a, the first tree information update unit 503 may subordinate the extracted second morphemes to the basic morphemes, which correspond to the first morphemes, as lower hierarchical information. The first tree information update unit 503 may check attributes of the second morphemes.

According to another embodiment, the attribute may distinguish whether the second morpheme is a morpheme representing a place, whether it is a morpheme representing a target (such as animal, person or article), and whether it is a morpheme representing the number of target. For example, when "커피숍" among the second morphemes is subordinated as the lower hierarchical information of the basic morphemes, the first tree information update unit 503 may identify that the second morpheme "coffee" is a morpheme representing a target, and the "숍" is a morpheme representing a place, based on the pre-stored basic morpheme dictionary table. For another example, in the case of Korean language, since an ending or a morpheme positioned at an end modifies a meaning of a whole word, the first tree information update unit 503 may identify the attribute of the second morpheme "커피숍" as a place (where).

According to one embodiment, the word extraction unit 505 may extract second words as remaining words other than first words corresponding to at least one of the basic words contained in the pre-stored basic word dictionary table, among the words contained in each of the second language-based basic sentences from which the sentence patterns are determined.

The basic word refers to a word stored in the pre-stored basic word dictionary table, and may be reference information for extracting a second word, which is a morpheme associated with the basic word, based on the basic word from a plurality of basic sentences, so as to match with the extracted second word. The first word refers to a word contained in the basic sentences, and may be a configuration corresponding to the basic word. In other words, the basic word may be information serving as a reference for extracting additional information.

For example, the word extraction unit 505 may extract second words from a plurality of basic sentences 501b "I ordered a cup of Americano coffee" and "waiting for the meeting at the coffee shop". In the pre-stored basic word dictionary table, "a cup of Americano coffee" and "meeting at the coffee shop" may be stored as basic words. In other words, the word extraction unit 505 may recognize "a cup of Americano coffee" and "meeting at the coffee shop", which correspond to the basic words in the basic sentences 501b, as the first words, and may extract "I ordered", "아메리카노" (Americano) and "waiting for the", which are the remaining words other than the first words, as the second words.

According to one embodiment, when the second words are completely extracted, the second tree information update unit 507 may designate the second words as additional information for the first words, thereby updating the tree information of the first words. The tree information updated by the second tree information update unit 507 refers to information of a tree structure subordinated to each basic word for each sentence pattern, and may be information updated as the second word designated when the additional information is updated to lower hierarchical information of the basic word.

According to one embodiment, the learning system may generate and update separate tree information for each basic word for each sentence pattern, to subordinate the second word, as new additional information to lower hierarchical information of the basic word, so that data required for syntax analysis may be accumulated. In other words, the tree information may be information generated or updated as a new word associated with the basic word is added, based on the sentence patterns and the basic words.

For example, when the second words are completely extracted from the basic sentences, the second tree information update unit 507 may subordinate the extracted second words to the basic words, which correspond to the first words, as lower hierarchical information. More particularly, the second tree information update unit 507 may subordinate the second words "I ordered" to the basic words "a cup of Americano coffee" as lower hierarchical information, thereby updating the tree information.

FIG. 6 is a block diagram for explaining the additional information storage unit of the foreign language phrases learning system based on basic sentence pattern unit decomposition according to one embodiment of the present invention.

Referring to FIG. 6, the foreign language phrases learning system based on basic sentence pattern unit decomposition and implemented in a computing device including at least one processor and at least one memory for storing instructions executable by the processor (e.g., the foreign language phrases learning system 100 based on basic sentence pattern unit decomposition of FIG. 1 (hereinafter referred to as a learning system)) may include an additional information storage unit 600 (e.g., the additional information storage unit 107 of FIG. 1).

According to one embodiment, when additional information is completely designated by the additional information designation unit (e.g., the additional information designation unit 500 of FIG. 5), the additional information storage unit 600 may match the additional information with the morphemes, which are not designated as the additional information (e.g., the first morphemes), so that the additional information may be stored in a basic morpheme category included in a pre-stored basic morpheme dictionary table.

According to one embodiment, the pre-stored basic morpheme dictionary table may be a data table including a plurality of basic morpheme categories based on basic morphemes serving as criteria for extracting the second morphemes for each sentence pattern. The pre-stored basic morpheme dictionary table may be formed in a graph structure for each of the basic morpheme categories in order to provide functions of searching and extracting additional information included in each of the basic morpheme categories.

According to one embodiment, when the tree information 603 of the first morpheme is updated by the first tree information update unit (e.g., the first tree information update unit 503 of FIG. 5), the additional information storage unit 600 may update one additional information in the basic morpheme categories included in the pre-stored basic morpheme dictionary table, based on the updated content. When the additional information of the basic morpheme category 605 is updated, the additional information storage unit 600 may distinguish the hierarchical information of the basic morpheme category 605 based on the updated content, thereby updating the additional information.

For example, when "미팅" or "기다리다" is designated as the basic morpheme in the tree information 603, the additional information storage unit 600 may subordinate the second morphemes "커피숍에서" as additional information of the basic morpheme to lower hierarchical information of "미팅을 기다리다". Accordingly, the tree information 603 may be updated. When the tree information 603 is updated, the additional information storage unit 600 may update additional information of the basic morpheme category 605 based on "기다렸다" and "미팅", which is included in the basic morpheme categories contained in the pre-stored morpheme dictionary table, based on the updated content.

According to one embodiment, the basic morpheme category 605 may include an upper hierarchical item, a middle hierarchical item, and a lower hierarchical item. The upper hierarchical item, the middle hierarchical item, and the lower hierarchical item may be configurations included in each basic morpheme category 605 in order to facilitate the retrieval and extraction of additional information.

In addition, when the additional information is updated in the basic category 605, the additional information storage unit 600 may identify the attribute of the additional information, and store the additional information in the upper hierarchical item, the middle hierarchical item, the and lower hierarchical item corresponding to the identified attribute. See FIG. 5 for detailed description related to the attribute. For example, when the second morpheme, that is, the attribute of the additional information (커피숍) is identified as a place (where), the additional information storage unit 600 may store the additional information (커피숍) in the upper hierarchy having an attribute of "place" in the upper hierarchical item of the basic morpheme category 605. The second morpheme may be stored in the basic morpheme category based on the basic morphemes "기다렸다" and "미팅".

For example, the additional information storage unit 600 may store the additional information (커피숍) in the upper hierarchical item having the attribute of "place", and classify the additional information into at least one middle hierarchical item (business site) included in the upper hierarchical item, and a lower hierarchical item included in the middle hierarchical item (business site). The additional information storage unit 600 may identify that the additional information "커피숍" (coffee shop) is an English word having an attribute of place "숍" (shop) and denoting a store, thereby storing the additional information "커피숍" in a lower hierarchical item included in a middle hierarchy having the attribute of business site.

In other words, the additional information storage unit 600 may update the basic morpheme category 605 included in the pre-stored basic morpheme dictionary table based on the updated content of the tree information 603 of the first morpheme, thereby synchronizing the pre-stored morpheme dictionary table based on the tree information of the first morpheme.

According to one embodiment, when the additional information is completely designated by the additional information designation unit, the additional information storage unit 600 may match the additional information with the words, which are not designated as the additional information (e.g., the first words), so that the additional information may be stored in a basic word category included in a pre-stored basic word dictionary table.

According to one embodiment, the pre-stored basic word dictionary table may be a data table including a plurality of basic word categories based on the basic words serving as the criteria for extracting the second words for each sentence pattern. The pre-stored basic word dictionary table may be formed in a graph structure for each of the basic word categories in order to provide functions of searching and extracting additional information included in each of the basic word categories.

According to one embodiment, when the tree information of the second word is updated by the second tree information update unit (e.g., the tree information update unit 507 of FIG. 5), the additional information storage unit 600 may update one additional information in the basic word categories included in the pre-stored basic word dictionary table, based on the updated content. When the additional information of the basic word category is updated, the additional information storage unit 600 may distinguish the hierarchical information of the basic word category based on the updated content, thereby updating the additional information.

For example, when the sentence of "a cup of Americano coffee" is designated with words included in the base words in the tree information, the additional information storage unit 600 may subordinate the second words "I ordered" as additional information of the basic words, to lower hierarchical information of "a cup of Americano coffee". Accordingly, the tree information may be updated. When the tree information is updated, the additional information storage unit 600 may update additional information of the basic word category based on "Americano coffee" and "a cup of" included in the basic word categories contained in the pre-stored word dictionary table, based on the updated content.

According to one embodiment, the basic word category may include an upper hierarchical item, a middle hierarchical item, and a lower hierarchical item. The upper hierarchical item, the middle hierarchical item, and the lower hierarchical item may be configurations included in each basic word category in order to facilitate the retrieval and extraction of additional information.

In addition, when the additional information is updated in the basic word category, the additional information storage unit 600 may identify the attribute of the additional information, and store the additional information in the upper hierarchical item, the middle hierarchical item, and the lower hierarchical item corresponding to the identified attribute. See FIG. 5 for detailed description related to the attribute. For example, when the second word, that is, the attribute of the additional information ("I ordered") is identified as an action, the additional information storage unit 600 may store the additional information ("I ordered") in the upper hierarchy having an attribute of "action" in the upper hierarchical item of the basic word category. The second word may be stored in the basic word category based on the basic words "a cup of Americano coffee".

For example, the additional information storage unit 600 may store the additional information ("I ordered") in the upper hierarchical item having the attribute of "action", and classify the additional information into at least one middle hierarchical item (count) included in the upper hierarchical item, and a lower hierarchical item included in the middle hierarchical item (count). In other words, the additional information storage unit 600 may update the basic word category included in the pre-stored basic word dictionary table based on the updated content of the tree information of the first word, thereby synchronizing the pre-stored word dictionary table based on the tree information of the first word.

FIG. 7 is a diagram for explaining an example of an internal configuration of a computing device according to one embodiment of the present invention.

FIG. 7 shows one example of an internal configuration of a computing device according to one embodiment of the present invention. In the following description, unnecessary descriptions for embodiments redundant with those of FIGS. 1 to 6 will be omitted.

As shown in FIG. 7, the computing device 10000 may at least include at least one processor 11100, a memory 11200, a peripheral device interface 11300, an input/output subsystem (I/O subsystem) 11400, a power circuit 11500, and a communication circuit 11600. The computing device 10000 may correspond to a user terminal A connected to a tactile interface device or correspond to the above-mentioned computing device B.

The memory 11200, may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 10000.

The access to the memory 11200 from other components of the processor 11100 or the peripheral interface 11300, may be controlled by the processor 11100.

The peripheral interface 11300 may combine an input and/or output peripheral device of the computing device 10000 to the processor 11100 and the memory 11200. The processor 11100 may execute the software module or the instruction set stored in memory 11200, thereby performing various functions for the computing device 10000 and processing data.

The input/output subsystem 11400 may combine various input/output peripheral devices to the peripheral interface 11300. For example, the input/output subsystem 11400 may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the I/O subsystem 11400.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or arbitrary other components for generating, managing, or distributing power.

The communication circuit 11600 may use at least one external port to enable communication with other computing devices.

Alternatively, as described above, the communication circuit 11600 may, if necessary, transmit and receive an RF signal, also known as an electromagnetic signal, including RF circuitry, thereby enabling communication with other computing devices.

The above embodiment of FIG. 7 is merely an example of the computing device 10000, and the computing device 11000 may have a configuration or arrangement in which some components shown in FIG. 7 are omitted, additional components not shown in FIG. 7 are further provided, or at least two components are combined. For example, a computing device for a communication terminal in a mobile environment may further include a touch screen, a sensor or the like in addition to the components shown in FIG. 7, and the communication circuit 1160 may include a circuit for RF communication of various communication schemes (such as WiFi, 3G, LTE, Bluetooth, NFC, and Zigbee). The components that may be included in the computing device 10000 may be implemented by hardware, software, or a combination of both hardware and software which include at least one integrated circuit specialized in a signal processing or an application.

The methods according to the embodiments of the present invention may be implemented in the form of program instructions to be executed through various computing devices so as to be recorded in a computer-readable medium. In particular, a program according to the embodiment may be configured as a PC-based program or an application dedicated to a mobile terminal. The application to which the present invention is applied may be installed in a user terminal through a file provided by a file distribution system. For example, the file distribution system may include a file transmission unit (not shown) that transmits the file according to the request of the user terminal.

The device described above may be implemented as a hardware component, a software component, and/or a combination of hardware components and software components. For example, the devices and components described in the embodiments may be implemented by using at least one general purpose computer or special purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, some cases may have described that one processing device is used, however, it will be appreciated by those skilled in the art that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, and computer storage medium or device. The software may be distributed over computing devices connected to networks, so as to be stored or executed in a distributed manner.

The software and data may be stored in at least one computer-readable recording medium.

The method according to the embodiment may be implemented in the form of program instructions to be executed through various computing mechanisms, so as to be recorded in a computer-readable medium. The computer-readable medium may include program instructions, data files, data structures, and the like, independently or in combination thereof. The program instructions recorded in the medium may be specially designed and configured for the embodiment, or may be known to those skilled in the art of computer software so as to be used. An example of the computer-readable medium includes a magnetic medium such as a hard disk, a floppy disk and a magnetic tape, an optical medium such as a CD-ROM and a DVD, a magneto-optical medium such as a floptical disk, and a hardware device specially configured to store and execute a program instruction such as ROM, RAM, and flash memory. An example of the program instruction includes a high-level language code to be executed by a computer using an interpreter or the like, as well as a machine code generated by a compiler. The above hardware device may be configured to operate as at least one software module to perform the operations of the embodiments, and vise versa.

Although the above embodiments have been described with reference to the limited embodiments and drawings, however, it will be understood by those skilled in the art that various changes and modifications may be made from the above-mentioned description For example, even though the described descriptions may be performed in an order different from the described manner, and/or the described components such as system, structure, device, and circuit may be coupled or combined in a form different from the described manner, or replaced or substituted by other components or equivalents, appropriate results may be achieved. Therefore, other implementations, other embodiments, and equivalents to the claims are also within the scope of the following claims.

The invention claimed is:

1. A foreign language phrases learning system based on a basic sentence pattern unit decomposition, and implemented in a computing device including at least one processor and at least one memory for storing instructions executable by the processor, the foreign language phrases learning system comprising:
   a sentence decomposition unit, when a natural language composed of a foreign language is input from a user, for decomposing a compound sentence corresponding to the input natural language into a plurality of basic sentences;
   a sentence pattern determination unit for examining each of morphemes or words in each of the decomposed basic sentences when the compound sentence is completely decomposed by the sentence decomposition unit, thereby determining a sentence pattern for each of the basic sentences;
   an additional information designation unit, when the sentence pattern for each of the basic sentences is identified by the sentence pattern determination unit, for designating some of the morphemes or the words in each of the basic sentences as additional information, wherein the additional information designation unit is configured to:
   identify a first group of recognized one or more morphemes or words from the basic sentence by checking whether the one or more morphemes or words in the basic sentence are found in a pre-stored basic morpheme dictionary:
   extract a second group of one or more unrecognized morphemes or words from the basic sentence that is not found in the data dictionary; and
   assign the unrecognized morphemes or words in the second group as child nodes of hierarchical data structures of corresponding recognized morphemes or words in the first group, respectively, wherein each of the hierarchical data structures originates from each corresponding recognized morpheme or word; and
   an additional information storage unit configured to:
   match the additional information with one of the morphemes or the words, which are not designated as the additional information, when the designation of the additional information is completed; and,
   store the additional information in a specific location within the pre-stored basic morpheme dictionary table corresponding to one of the recognized morpheme or word of the first group by identifying characteristics of the additional information related to a corresponding one of the recognized morphemes or words in the first group, wherein the database table is divided into a number of different categories, each category organized hierarchically from a broadest level to a specific level.

2. The foreign language phrases learning system of claim 1, wherein the sentence decomposition unit includes:
   a language identification unit for identifying a country for each foreign language corresponding to the natural language when the natural language is input, thereby determining whether the language of the identified country is a morpheme-based first language or a word-based second language;
   a morpheme decomposition unit for identifying a plurality of morphemes contained in a compound sentence corresponding to the input natural language when the natural language input by the language identification unit is determined as the first language, thereby decomposing the compound sentence according to morpheme;
   a word decomposition unit for identifying a plurality of words contained in a compound sentence corresponding to the input natural language when the natural language input by the language identification unit is determined as the second language, thereby decomposing the compound sentence according to words;
   a unit decomposition unit, when the compound sentence is decomposed according to the morphemes or the words by performing the function of the morpheme decomposition unit or the word decomposition unit, for analyzing the decomposed morphemes or words, thereby decomposing the compound sentence into predicate units based on the analysis results; and
   a basic sentence generation unit, when the compound sentence is decomposed into the predicate units by the unit decomposition unit, for generating the compound sentence, which is decomposed into the predicate units, as a plurality of basic sentences.

3. The foreign language phrases learning system of claim 2, wherein the sentence pattern determination unit includes:
   a word segment confirmation unit, when a plurality of basic sentences based on the first language or a plurality of basic sentences based on the second language are generated by the basic sentence generation unit, for confirming a plurality of word segments constituting each of the generated basic sentences based on the first language or the basic sentences based on the second language;

a component classification unit, when the word segments for the basic sentences based on the first language or the basic sentences based on the second language are completely confirmed by the word segment confirmation unit, for identifying word classes of the morphemes or words contained in the word segments based on pre-stored word class classification information, thereby classifying sentence components of the word segments through the identified word classes, respectively; and a sentence pattern determining unit, when the sentence components of the word segments are completely classified by the component classification unit, for identifying combinatorial relationships between the classified sentence components, thereby determining a sentence pattern for the basic sentences based on the first language or the basic sentences based on the second language.

4. The foreign language phrases learning system of claim 3, wherein the sentence pattern serves as a sentential form for each of the basic sentences determined based on combinational relationships between sentence components of the word segments or combinatorial relationships between sentence components of the words, and includes:

a first pattern configured by a combination of a subject and a predicate;

a second pattern configured by a combination of the subject, an adverb and the predicate;

a third pattern configured by a combination of the subject, an object and the predicate;

a fourth pattern configured by a combination of the subject, a complement and the predicate; and a fifth type configured by a combination of the subject, the object, the complement and the predicate.

5. The foreign language phrases learning system of claim 3, wherein the additional information designation unit includes:

a morpheme extraction unit that extracts second morphemes as remaining morphemes other than first morphemes corresponding to at least one of the basic morphemes contained in the pre-stored basic morpheme dictionary table among the morphemes contained in each of the first language-based basic sentences from which the sentence patterns are determined;

a first tree information update unit for designating the second morphemes as additional information for the first morphemes when the second morphemes are completely extracted, thereby updating tree information of the first morphemes;

a word extraction unit that extracts second words as remaining words other than first words corresponding to at least one of the basic words contained in the pre-stored basic word dictionary table among the words contained in each of the second language-based basic sentences from which the sentence patterns are determined; and a second tree information update unit for designating the second words as additional information for the first words when the second words are completely extracted, thereby updating tree information of the first words.

6. The foreign language phrases learning system of claim 5, wherein the tree information includes information of a tree structure subordinated to each basic morpheme or each basic word for each sentence pattern, in which the second morpheme designated as the additional information is updated to lower hierarchical information of the basic morpheme, or the second word designated as the additional information is updated to lower hierarchical information of the basic word.

7. The foreign language phrases learning system of claim 6, wherein the additional information storage unit, when tree information of the first morpheme is updated by the tree information update unit, updates one additional information in the basic morpheme categories included in the pre-stored basic morpheme dictionary table based on the updated content, thereby synchronizing the pre-stored basic morpheme dictionary table based on tree information of the first morpheme, or when tree information of the first word is updated by the tree information update unit, updates one additional information in the basic word categories included in the pre-stored basic word dictionary table based on the updated content, thereby synchronizing the pre-stored basic word dictionary table based on tree information of the first word.

8. The foreign language phrases learning system of claim 7, wherein the pre-stored basic morpheme dictionary table includes data including a plurality of basic morpheme categories based on the basic morphemes serving as criteria for extracting the second morphemes for each sentence pattern, and is formed in a graph structure for each of the basic morpheme categories in order to provide functions of searching and extracting additional information included in each of the basic morpheme categories, and the pre-stored basic word dictionary table includes data including a plurality of basic word categories based on the basic words serving as criteria for extracting the second words for each sentence pattern, and is formed in a graph structure for each of the basic word categories in order to provide functions of searching and extracting additional information included in each of the basic word categories.

* * * * *